United States Patent
Kazmi et al.

(10) Patent No.: US 9,521,544 B2
(45) Date of Patent: Dec. 13, 2016

(54) AVAILABILITY OF MODES OF COMMUNICATION

(71) Applicant: Telefonaktiebolaget L M Ericsson (publ), Stockholm (SE)

(72) Inventors: Muhammad Kazmi, Bromma (SE); Stefania Sesia, Roquefort les Pins (FR); Mikael Zirén, Kävlinge (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 5 days.

(21) Appl. No.: 14/419,114

(22) PCT Filed: Jul. 23, 2013

(86) PCT No.: PCT/SE2013/050925
§ 371 (c)(1),
(2) Date: Feb. 2, 2015

(87) PCT Pub. No.: WO2014/021767
PCT Pub. Date: Feb. 6, 2014

(65) Prior Publication Data
US 2015/0201326 A1     Jul. 16, 2015

Related U.S. Application Data

(60) Provisional application No. 61/679,131, filed on Aug. 3, 2012.

(51) Int. Cl.
*H04W 8/24* (2009.01)
*H04W 72/04* (2009.01)
(Continued)

(52) U.S. Cl.
CPC ............ *H04W 8/24* (2013.01); *H04B 7/0413* (2013.01); *H04B 7/0417* (2013.01);
(Continued)

(58) Field of Classification Search
CPC ...... H04W 28/18; H04W 8/24; H04W 72/048; H04W 88/06; H04B 7/0413; H04B 7/0417; H04B 7/0619; H04B 7/0689; H04B 7/0647
See application file for complete search history.

(56) References Cited

U.S. PATENT DOCUMENTS 8,917,696 B2 * 12/2014 Wan ................. H04J 11/0093
                                              370/204
2006/0013250 A1 * 1/2006 Howard ............. H04B 7/0417
                                              370/465
(Continued)

FOREIGN PATENT DOCUMENTS

EP    2214445 A1    8/2010
EP    2542003 A1    1/2013

OTHER PUBLICATIONS

3GPP, "3rd Generation Partnership Project; Technical Specification Group Radio Access Network; Evolved Universal Terrestrial Radio Access (E-UTRA); User Equipment (UE) radio transmission and reception (Release 11)", 3GPP TS 36.101 V11.0.0, Mar. 2012, 1-316.
(Continued)

*Primary Examiner* — Brian D Nguyen
(74) *Attorney, Agent, or Firm* — Patent Portfolio Builders, PLLC

(57) ABSTRACT

A communication network is informed of the availability of MIMO mode of communication of user equipment by receiving a transmitted (305) indicator of the availability of MIMO mode of communication of a user equipment via a feedback channel between the user equipment and a node of a communication network.

23 Claims, 3 Drawing Sheets

(51) Int. Cl.
  *H04B 7/04* (2006.01)
  *H04W 28/18* (2009.01)
  *H04B 7/06* (2006.01)
  *H04W 88/06* (2009.01)

(52) U.S. Cl.
  CPC ......... *H04B 7/0619* (2013.01); *H04B 7/0647* (2013.01); *H04B 7/0689* (2013.01); *H04W 28/18* (2013.01); *H04W 72/048* (2013.01); *H04W 88/06* (2013.01)

(56) References Cited

U.S. PATENT DOCUMENTS

| | | | | |
|---|---|---|---|---|
| 2006/0114858 A1* | 6/2006 | Walton | ................. | H04B 7/0417 370/335 |
| 2008/0080635 A1 | 4/2008 | Hugl et al. | | |
| 2009/0316807 A1* | 12/2009 | Kim | ................. | H04B 7/061 375/260 |
| 2010/0091919 A1* | 4/2010 | Xu | ................. | H04L 1/0025 375/346 |
| 2011/0064043 A1* | 3/2011 | Balachandran | ....... | H04L 5/0037 370/330 |
| 2012/0120998 A1* | 5/2012 | Fakhrai | ................. | H04B 7/0413 375/224 |

OTHER PUBLICATIONS

3GPP, "3rd Generation Partnership Project; Technical Specification Group Radio Access Network; Physical layer procedures (FDD) (Release 11)", 3GPP TS 25.214 V11.1.0, Mar. 2012, 1-106.

3GPP, "3rd Generation Partnership Project; Technical Specification Group Radio Access Network; User Equipment (UE) radio transmission and reception (FDD) (Release 11)", 3GPP TS 25.101 V11.1.0, Mar. 2012, 1-286.

Unknown, Autho, "Clarification of Rel-10 UE category and MIMO layer capability definition", Research In Motion UK Limited, 3GPP TSG RAN WG1 Meeting #63bis, R1-110283, Dublin, Ireland, Jan. 17-21, 2011, 1-4.

Unknown, Author, "Specification impact analysis of 8C-HSDPA", Huawei, HiSilicon, 3GPP TSG RAN WG1 Meeting #63bis, R1-110318, Dublin, Ireland, Jan. 17-21, 2011, 1-4.

Unknown, Author, "UE capability signalling for CA and MIMO in REL10", Nokia Siemens Networks, Nokia Corporation, 3GPP TSG-RAN WG2 Meeting #72, R2-106411, Jacksonville, U.S.A, Nov. 15-19, 2010, 1-12.

Research in Motion UK Limited: "Clarification of Rel-10 UE category and MIMO layer capability definition," 3GPP TSG RAN WG2 Meeting #72bis, R2-110224, Jan. 17-21, 2011, pp. 1-4.

Office Action in EP application No. 13825780.3 mailed Dec. 16, 2015.

* cited by examiner

AVAILABILITY OF MODES OF COMMUNICATION

TECHNICAL FIELD

The invention relates to a method of informing a communication network of availability of modes of communication of user equipment (UE) and of controlling the modes of communication. In particular, it relates to availability of the UE of Multiple Input Multiple Output (MIMO) mode of communication.

BACKGROUND

UEs are required, increasingly, to have a smaller physical size, smaller morphological configuration etc. which results in limited space to implement the antennas. Further, the UE is required to communicate over several different frequency bands. The supported bands can be combination of high frequency bands at ~2 GHz and low frequency bands at [18] 800 MHz. For UEs which support MIMO signals and MIMO capabilities to the network are also required to provide this signaled capability for all the frequency bands. High spatial multiplexing or diversity MIMO gains are achieved when the antennas are sufficiently separated to guarantee a certain degree of decorrelation between the channel paths. For the low frequency bands the distance between the antennas needed in order to achieve sufficient decorrelation can be too high considering the limited space available for the size of the UE.

Furthermore, the use of the secondary antenna at the low frequency bands drains current and has an impact on the UE's complexity whilst providing insufficient gain. When a MIMO UE does an inter frequency cell change (e.g. cell reselection, handover procedure) from a high frequency band to a low frequency band it has to continue using MIMO. This in turn increases the complexity of the UE, performance loss and in some cases the UE behavior may be unclear.

MIMO is an advanced antenna technique to improve the spectral efficiency and thereby boost the overall system capacity. MIMO implies that both the base station and the UE employ multiple antennas. There exists a variety of MIMO techniques or modes such as Per Antenna Rate Control (PARC), selective PARC (S-PARC), transmit diversity, receiver diversity, Double Transmit Antenna Array (D-TxAA) etc. The D-TxAA is an advanced version of transmit diversity, which is already used in WCDMA for example as specified by 3GPP TS 25.101, "User Equipment (UE) radio transmission and reception (FDD)"

The MIMO is used in all major technologies e.g. in WCDMA/HSPA, LTE, CDMA2000, Wi Fi/WLAN etc. For example in LTE there are 9 different MIMO techniques (aka transmission modes) specified. Most of these MIMO modes are mandatory for all UEs for all bands.

Irrespective of the MIMO technique the notation (M×N) is generally used to represent MIMO configuration in terms of the number of transmit (M) and receive antennas (N). The common MIMO configurations used or currently discussed for various technologies are: (2×1), (1×2), (2×2), (4×2), (8×2) and (8×4). The configurations represented by (2×1) and (1×2) are special cases of MIMO and they correspond to transmit diversity and receiver diversity respectively. The configuration (2×2) will be used in WCDMA release 7.

In particular the WCDMA FDD release 7 will support double transmit antenna array (D-TxAA) in the downlink, which is a multiple input multiple output (MIMO) technique to enhanced capacity as disclosed by 3GPP TS 25.214, "Physical layer procedures (FDD)".

The E-UTRAN downlink will indeed support several MIMO schemes including MIMO techniques including Single User-MIMO (SU-MIMO) and Multi User-MIMO (MU-MIMO) disclosed by 3GPP TS 25.101, "User Equipment (UE) radio transmission and reception (FDD)".

The MIMO technology has also been widely adopted in other wireless communication standards e.g., IEEE802.16.

The limited size of the UE results in limited distance between the antennas. As a result, the antennas may be optimized only for certain portion of the spectrum. The decorrelation between the antennas depends on the wavelength, in particular the distance between the antennas should be higher than a certain fraction of the wavelength, and the wavelength depends on the carrier frequency at which the UE is operating, L=C/f where C is the speed of light and the f is the frequency the wave is operating. For example, at f=2 GHz the wavelength is L=15 cm, while at 800 MHz L=37 cm and of course higher for lower bands. The optimal distance between the antennas is approximately equal to the wavelength of the carrier frequency divided by 2.

Therefore, due to the reduced size of the UEs, the required distance between the antennas and hence sufficient decorrelation cannot be achieved at low frequency, and hence all the benefits of multiple streams MIMO cannot be achieved. However the UE will continue to consume power if the secondary antenna is required to be active even in these low frequency bands.

When the UE supports MIMO, it signals this capability via RRC signaling to the network. This capability is valid for all the frequency bands the UE supports. The UE in general will support several frequency bands (high bands and low bands, depending on the deployment and on roaming). Hence the UE will have high power consumption for low gains when operating in the low frequency bands. Hence it is important to provide a method for the UE to change its capability when operating in a low frequency band.

Certain MIMO mode(s) may also be mandatory for all UEs. For example in LTE the MIMO transmission modes 1-8 (TM1-TM8) are mandatory for all UEs. This means UE does not signal its MIMO capability for these MIMO modes. However the introduction of large number of bands for LTE means that the UE has to support these MIMO modes for all supported bands. However this will be very challenging for the UE given the large differences between frequency ranges of the LTE bands. On the other hand TM9 is optional. Therefore UE signals its capability but the UE also has to support TM9 for all bands.

This is particularly true when a MIMO UE does an inter frequency cell change (e.g. handover procedure) from a high frequency band to a low frequency band in connected mode. Under these circumstances the UE cannot change autonomously its capability. This may cause multiple problems e.g. degradation of performance, loss of scheduling grant, UE implementation complexity since UE will have to implement MIMO on all bands etc.

Starting from rel-8 new UE capabilities have been introduced in 3GPP, mainly Multi-carrier HSDPA, where the UE is capable of receiving the signal on multiple carriers in the same time. Multi-carrier HSDPA can be also deployed with MIMO on each carrier to enhance further the data rate. In many densely populated areas such as hotspots an operator deploys more than one cell in the same geographical area, e.g. several cells in one sector. Each base station or Node B typically provides coverage to 3 sectors. As an example, a deployment with 2 carriers per Node B implies 2 co-located cells per sector and 6 cells per Node B.

In UTRAN system this corresponds to multiple cells 103 of 5 MHz each as shown in FIG. 1. Such cells 103 are also termed as 'co-located cells'. The co-located cells 103 are served by the same base station or the Node B 101 over a plurality of carrier frequencies 105_1 to 105_n.

Similar arrangement would be possible in E-UTRAN disclosed, for example, in 3GPP TS 36.101, "User Equipment (UE) radio transmission and reception (EDD)". In E-UTRAN due to variable carrier frequency bandwidth the co-located cells may have different bandwidth and therefore they have different maximum transmission power levels. This is shown in FIG. 2. The base station or eNode B 201 serves co-located cells 203 over a plurality of carrier frequencies 205_1 to 205_n having difference bandwidths. However, even in E-UTRAN the co-located cells with the same bandwidth would still be the most common deployment.

In 3GPP currently several carrier aggregation configurations are defined both for UTRA and E-UTRA. Carrier aggregation can be defined for intra frequency deployments where the carriers can be located adjacent or non adjacent, or it can be defined for inter-frequency deployments where the aggregated carriers belong to different bands.

It can be noticed that the UE may need to support carrier aggregation where high and low bands participate in the configuration, such as for instance band I combined with band VIII. When the UE reports MIMO capability it is supposed to support MIMO on both the carriers. However, for a small sized UE scheduling MIMO won't bring the expected gains. Hence it would be beneficial for the UE to inform the network that MIMO is not supported for this particular band, to switch off the secondary antenna and to reduce battery consumption. The network can also reduce the extra complexity due to MIMO scheduling in this particular frequency band.

For downlink MIMO, after an inter-frequency handover, when the UE hands over a low frequency for which the size of the UE does not allow to have sufficient path decorrelation and when the UE is scheduled by considering multi band multi-carrier configuration where at least one low frequency participates in the carrier aggregation configuration. For uplink MIMO, after an inter-frequency cell change (e.g. handover), When the UE changes cell operating at a low frequency for which the form factor does not allow to have sufficient path decorrelation. When the UE is scheduled by considering multi band multi-carrier configuration where at least one low frequency participates in the carrier aggregation configuration and the uplink carrier is anchored to the low frequency band. This is applicable for both UTRA and E-UTRA.

SUMMARY

According to a first aspect of the invention, there is provided a method of operating user equipment in a communication network to inform the communication network of the availability of MIMO mode of communication. The method comprises determining the availability of MIMO mode of communication of the user equipment; and transmitting an indicator of the availability of MIMO mode of communication of the user equipment via a feedback channel between the user equipment and a node of a communication network. The indicator is transmitted as a specific sequence of feedback information on the feedback channel.

According to another aspect of the invention, there is provided a method of operating a node of a communication network to control the mode of communication between a communication network and at least one user equipment. The method comprises receiving, at a node of a communication network, an indicator of the availability of MIMO mode of communication of at least one user equipment via a feedback channel between the at least one user equipment and the node of the communication network. The indicator comprises a specific sequence of feedback information. The method further comprises controlling the MIMO mode of communication between the node of the communication network and the at least one user equipment in response to the received indicator.

According to yet another aspect of the invention there is provided a user equipment which includes a multi-antenna, a transceiver and a processor. The transceiver is configured to enable MIMO mode of communication between the user equipment and a node of a communication network via the multi-antenna. The processor is configured to determine the availability of MIMO mode of communication of the user equipment and to provide an indicator of the determined availability of MIMO mode of communication of the user equipment. The transceiver is further configured to transmit the indicator via a feedback channel between the user equipment and a node of a communication network in that the indicator comprises a specific sequence of feedback information.

According to yet another aspect of the invention there is provided a node of a communication network. The node comprises a receiver, an interpreter and a controller. The receiver is configured to receive an indicator of the availability of MIMO mode of communication of at least one user equipment via a feedback channel between the at least one user equipment and the node of the communication network. The indicator comprises of specific sequence of feedback information. The interpreter is configured to interpret the received indicator to determine the availability of MIMO mode of communication of the at least one user equipment. The controller is configured to control the mode of communication between the node of the communication network and the at least one user equipment and/or control cell change of user equipment in response to the interpreted sequence of feedback information.

In an embodiment the UE comprises signaling a feedback pattern sequence, for example Channel Quality Indicator (CQI) values to the network node, for example, base station. The pattern indicates whether the UE supports multi-antenna operation or not.

In an embodiment the pattern is pre-determined and may be sent upon inter-frequency cell change (e.g. handover) to a low frequency band (e.g. below 1 GHz).

In an embodiment, the network node may receive a feedback pattern sequence from the UE which is multi-antenna capable; determine whether UE supports multi-antenna under a given condition or scenario, for example, for specific frequency bands, say below 1 GHz; perform one or more radio operational tasks based on the determined UE support of multi-antenna operation, for example, restrict the use of multi-stream or multi-antenna operation for the UE or use single stream operation (transmission and/or reception) or non multi-antenna type of operation or multi-stream or multi-antenna operation but with reduced number of streams and/or antennas.

In an embodiment the network node may further forward the determined UE support of multi-antenna operation to other network nodes (e.g. RNC, neighboring base station), which may use the received information for network management tasks.

In an embodiment, the indicator is transmitted periodically, aperiodically or in response to a trigger. In a further embodiment the trigger comprises one or more of the following: upon user equipment receiving a cell change command or while performing a cell change; upon user equipment accessing a new cell; upon user equipment operating at specific band or frequency range; depending upon whether user equipment is also performing device to device communication with another user equipment; and depending upon user equipment battery power.

In a further embodiment, the node or other node comprises any one of the following: a base station, a Node B, an eNode B, an RNC, a BSC, an access point, a relay node, an MSR node, a SON node, a OSS node or an O&M node.

As a result if using an existing feedback channel, the UE can implicitly inform the network that MIMO is not supported anymore for specific frequency bands or that it is now supported knowing that currently 3GPP specification does not allow for a per band specific MIMO support capability. This situation may occur in different cases.

BRIEF DESCRIPTION OF THE DRAWINGS

The invention will now be described, by way of example only, with reference to the following drawings, in which.

DETAILED DESCRIPTION

Figure 1:
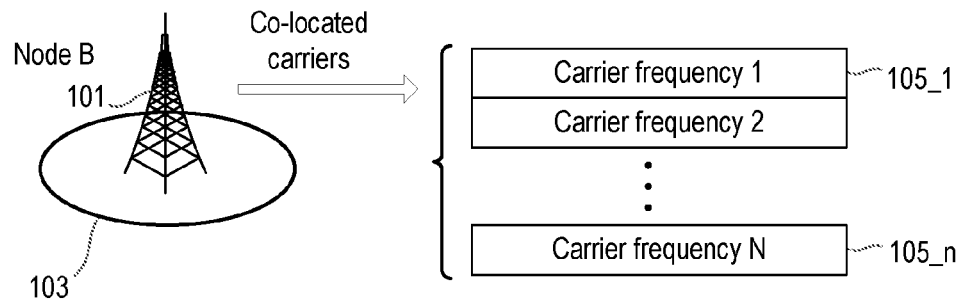
FIG. 1 is a simplified schematic of an example of co-located cells in UTRAN or E-TRAN communication systems.
Figure 2:
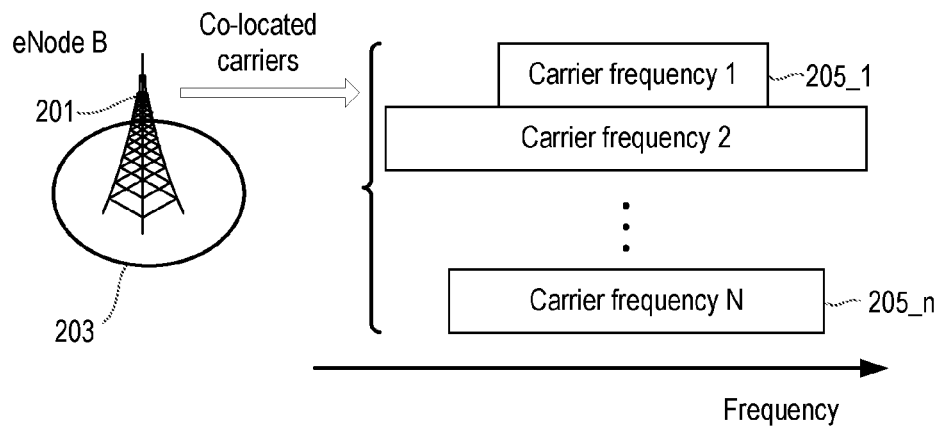
FIG. 2 is a simplified schematic of an example of co-located cells specific to E-TRAN communication system.
Figure 3:
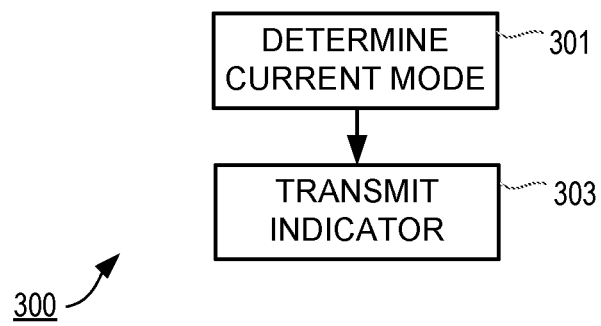
FIG. 3 is a flowchart of the method of informing a communication network of the availability of MIMO mode of communication of user equipment of an embodiment of the present invention.

As illustrated in FIG. 3, a communication network is informed of the availability of MIMO mode of communication of user equipment by transmitting (305) an indicator of the availability of MIMO mode of communication of a user equipment, for example, the current availability of MIMO mode of communication or the capability of MIMO communication of the UE, via a feedback channel between the user equipment and a node of a communication network, for example an existing feedback channel.

The UE is typically multi-band capable that is it generally supports more than one frequency bands depending upon its capability e.g. the same UE may support band I (2 GHz), band III (1800 MHz) and band VIII (900 MHz). The UE determines, step 301, whether MIMO can be supported for the currently supported frequency bands etc. The determination is based on pre-defined information stored in the UE at the time of its development. For example if a UE supports MIMO on one or more of the supported bands then this information is stored in the UE memory in the form of a lookup table mapping each band with an indicator whether MIMO is supported or not. It may also be pre-defined and thus stored in the UE that all its supported bands below certain frequency range (e.g. below 1 GHz) don't support MIMO. If the availability of MIMO in the UE has changed, the UE generates an indicator 303 which is then transmitted. The MIMO capabilities of the UE is predefined, for example a particular frequency band, i.e. a frequency band lower than a predetermined threshold, e.g. lower than 1 GHz does not support MIMO mode or for all the roaming bands, it may be determined that MIMO mode is not supported. The indicator comprises a specific sequence of feedback information (described in more detail below).

Figure 4:
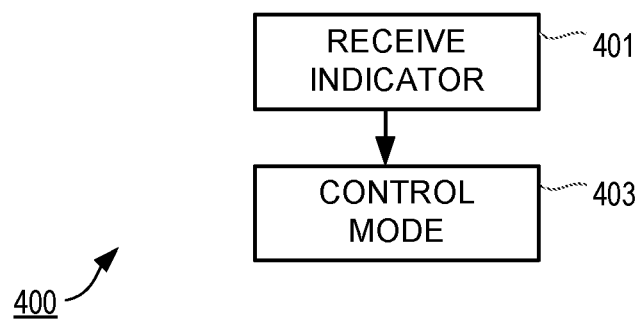
FIG. 4 is a flowchart of the method of controlling the mode of communication between a communication network and at least one user equipment of an embodiment of the present invention.

As illustrated in FIG. 4, the mode of communication between a communication network and at least one user equipment may be controlled by receiving, step 401, at a node of a communication network, an indicator of the current availability of MIMO mode of communication of at least one user equipment via an existing feedback channel between the at least one user equipment and the node of the communication network. The indicator comprises a specific sequence of feedback information. Then the MIMO mode of communication between the node of the communication network and the at least one user equipment is controlled, step 403, in response to the received indicator.

Figure 5:
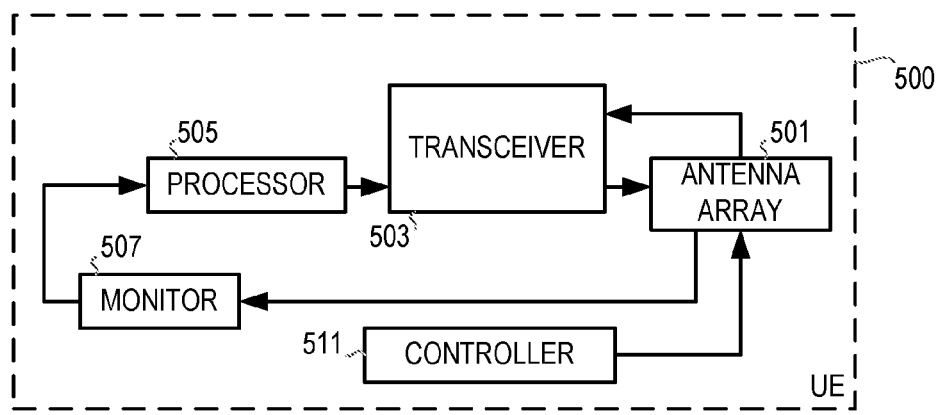
FIG. 5 is a simplified schematic of a user equipment of an embodiment of the present invention.

With reference to FIG. 5, the user equipment 500 comprises a multi-antenna (501). The multi-antenna 501 is connected to a transceiver 503. The transceiver is connected to a processor 505. The processor 505 is connected to a monitor 507. The monitor 507 monitors the operation of the device to determine whether MIMO is still supported for the current mode of operation, for example, for the particular frequency band or roaming bands. The UE 500 also comprises a controller 511 connected to the multi-antenna 501. The transceiver 503 is configured to enable MIMO mode of communication between the user equipment and a node of a communication network via the multi-antenna 501. The processor 505 is configured to determine the current availability of MIMO mode of communication of the user equipment and to generate an indicator of the determined availability of MIMO mode of communication of the user equipment. The transceiver 503 is further configured to transmit the generated indicator via a feedback channel between the user equipment and a node of a communication network.

Figure 6:
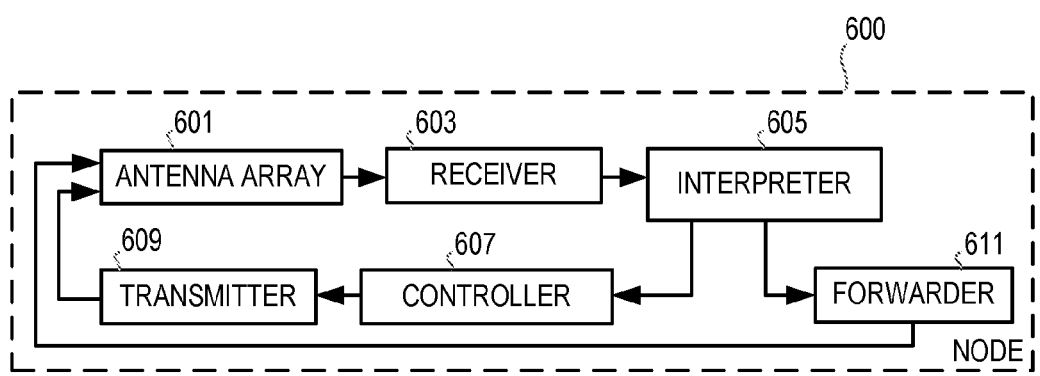
FIG. 6 is a simplified schematic of a node of a communication network of an embodiment of the present invention.

FIG. 6 illustrates an exemplary network node 600. The network node may comprise a serving RNC, serving eNode B, serving Node B, base station, access point, BSC, relay node, MSR node, donor node controlling relay node or the like. The node 600 comprises a receiver 603. The receiver 603 is connected to an antenna array 601. The receiver 603 is also connected to an interpreter 605. The interpreter 605 is connected to a controller 607 and a forwarder 611. The controller 607 is connected to a transmitter 609. The transmitter 609 is connected to the antenna array 601. The forwarder 611 is also connected to the antenna array 601. The receiver 603 is configured to receive an indicator of the availability of MIMO mode of communication of at least one user equipment 500 via a feedback channel between the at least one user equipment 500 and the node 600 of the communication network. This indicator is transmitted by the UE 500 on the form of a specific sequence of feedback information which indicates the availability of MIMO mode of communication, this is it indicates the support of multi-antenna operation. It may also indicate whether the UE 500 supports multi-antenna operation on a certain band or not. or supports multi-antenna operation with its full capability or with reduced capability e.g. whether UE capable of up to 4 stream operation may indicate that it can now support up to dual stream multi-operation.

In one example a specific pattern is sent when UE does not support multi-antenna operation. In another example the pattern is sent when UE supports reduced multi-antenna operation e.g. only dual stream but it can support up to 4 streams. The UE may send the pattern to the old serving network node prior to the cell change and/or to the new serving network node (i.e. target network node) after or during the cell change procedure. The protocol used for reporting the pattern depends upon the uplink channel used e.g. it can be sent on L1 signaling (e.g. over HS-DPCCH to base station), MAC PDU (e.g. to base station), RRC (e.g. over E-DCH to RNC) etc. The pattern may comprise additional information and the UE may also signal more than one pattern. In the embodiment, the pattern of sequence and associated information are predetermined. However the pattern may also be configurable and in which case the network node 600 may configure the UE 500 with one or more patterns.

It may happen that after the cell change of the UE to the network node operating in the new low frequency band (e.g. below 1 GHz) keeps scheduling multiple streams to the MIMO UE (in UpLink (UL), DownLink (DL) or both). Hence it is beneficial for the UE 500 to have the possibility to inform the network about the change in capability (not supporting multiple streams MIMO in the new band).

The interpreter 605 is configured to interpret the received indicator to determine the current availability of MIMO mode of communication of the at least one user equipment 500. The controller 607 is configured to control the mode of communication between the node 600 of the communication network and the at least one user equipment 500 in response to the interpreted sequence of feedback information by performing one or more radio operational tasks depending upon whether the UE 500 supports multi-antenna operation or not.

The embodiments described herein are not limited to UTRA FDD or E-UTRA bands. It can be appreciated that the embodiments may utilize any 3GPP bands and non-3GPP bands (e.g. CDMA2000 etc) including licensed and unlicensed bands (e.g. WLAN).

The MIMO is used in all major technologies, for example, in WCDMA/HSPA, LTE, CDMA2000, Wi Fi/WLAN etc. For example in LTE there are 9 different MIMO techniques (aka transmission modes) are specified. Most of these MIMO modes are mandatory for all UEs for all bands. The embodiments of the invention are applicable to all technologies supporting MIMO.

The embodiments are applicable to any type of downlink multi-antenna mode, for example, MIMO, transmit diversity, combination of multi-antenna with other features such as CA, multiflow operation (transmission and/or reception), CoMP etc.

This invention is applicable as well to multi-carrier capable UEs.

A pattern may be a specific sequence of feedback information, which the UE 500 can send on an existing feedback channel such as an uplink control channel. More specifically a pattern may comprise of: at least a pattern of sequence, for example, $CQI=[CQI_s(n), CQI_s(n+1), \ldots CQI_s(n+k)]$ with a specific length 'k' or $CQI=[f(CQI_1(n),CQI_2(n)) \; f(CQI_1(n+1),CQI_2(n+1)) \ldots f(CQI_1(n+k),CQI_2(n+k))]$ with specific $CQI_1/CQI_2$ values and specific length 'k' and, if necessary, additional information to facilitate determination and interpretation of the pattern. The pattern, and optionally the associated information, may be pre-determined and/or configured at the UE 500 by the network node 600. Using the pattern sequence, and using optionally the additional information, different patterns can be used for different functions. That is different patterns may be pre-defined and/or configurable for different functions e.g. one pattern for DL MIMO, one for UL MIMO, one for MIMO with carrier aggregation or for specific type of carrier aggregation (e.g. inter-band CA), one with multiflow operation, one with CoMP, one with combined CA and CoMP, one with combined multiflow operation and CA etc. These different patterns use at least a different sequence to distinguish between them. However the parameters associated with additional information may be the same or different when more than one pattern is used. Examples of additional information are: sequence length, for example, the number of elements in a sequence, duration over which pattern is sent etc; inter-sequence distance in time i.e. each element in a sequence is sent over every Nth TTI. Example every TTI (2 ms in HSPA), every $5^{th}$ TTI (i.e. every 10 ms); reference time i.e. from where pattern starting time is derived, for example, frame number such as SFN e.g. SFN=0, absolute time e.g. based on a global clock such as GPS, after M time instances (e.g. M frames) upon an event triggering the transmission of pattern (see below on triggering event); pattern start time i.e. at what time the pattern starts. It can be derived from a reference time e.g. K frames after SFN=0; pattern end time i.e. at what time the pattern stops, for example, it can be derived from a reference time e.g. L frames after SFN=0 and/or start time and sequence length; function or feature for which pattern is applicable, for example, whether the pattern is applicable to MIMO without carrier aggregation, MIMO with carrier aggregation, MIMO with CoMP/multi-point operation or any combination thereof; direction of applicable e.g. whether it applies to uplink multi-antenna operation, downlink multi-antenna operation or both; type of feedback information used in a pattern e.g. signal measurement, CSI reports, HARQ feedback, TFC, E-TFC, pilot sequence, reference signal sequence, contents in MAC protocol data unit (PDU), happy bit, power headroom (PH) or UE power headroom (UPH) etc, pattern of preamble sequences transmitted on a random access channel (RACH); type of uplink channel on which pattern is sent by UE e.g. uplink control channel e.g. HS-DPCCH in HSPA, E-DPCCH in HSPA, DPCCH in HSPA, S-DPCCH in HSPA, PUCCH in LTE etc, uplink data channel e.g. DCH in HSPA, E-DCH in HSPA, sounding DPCCH (S-DPCCH), PUSCH in LTE, physical signals e.g. pattern sent on a reference signal such as SRS in LTE, uplink logical control channel e.g. dedicated control channel (DCCH), RACH, in RRC signaling etc; pattern repetition characteristics e.g. whether it is periodic, aperiodic, one time transmission (i.e. pattern sent only once) etc; pattern triggering condition i.e. condition(s) under which the UE initiated transmission of the pattern to network node, for example, UE sends pattern upon a specific event or action, for example, upon receiving cell change command or while performing a cell change in connected and/or in low activity state, upon accessing a new cell e.g. at the time of initial access or while doing cell change, upon accessing a new cell or performing a cell change in a specific scenario. Examples of such scenarios are: inter-band inter-frequency/inter-Radio Access Technology (RAT) cell change, inter-band inter-frequency/inter-RAT cell change to a target cell operating at certain frequency such as one below 1 GHZ; and pattern terminating condition i.e. conditions under which the UE stops the ongoing transmission of the pattern e.g. when not receiving resource assignment for multi-antenna operation or receiving assignment for non-multi-antenna operation from the network node, when cell change procedure is completed, when UE operates at specific band or frequency range e.g. above 1 GHz.

The contents or elements of the pattern of sequence may comprise of one or more type of feedback information which UE 500 can send to the network node 600. For example any feedback information, which preferably not currently used by the UE, can be used in the pattern of sequence. For example feedback information associated with multi-antenna operation may not be used by the UE when low frequency band (e.g. below 1 GHz) is used. The network may also not configure UE to report certain type of feedback information. There may also be unused fields, which are reserved for future use, in feedback channel. Examples of such feedback information which can be used in a pattern by the UE are: CSI reports or any signal measurement e.g. CQI, precoding information etc; HARQ feedback for DL channel reception e.g. ACK/NACK etc; Transport format combination (TFC) or enhanced TFC (E-TFC) in HSPA sent by UE; Pilot sequence or reference signal sequence; Contents in MAC protocol data unit (PDU); Scheduling related information sent by UE e.g. happy bit, power headroom (PH) or UE power headroom (UPH).

In an embodiment, the pattern may further comprise feedback information containing a sequence of signal measurement values. A specific example of signal measurement is channel state information (CSI), which in turn may be channel quality indicator (CQI), precoding related information etc. Another preferred example of the feedback information, which can be used in a pattern is the HARQ related information e.g. ACK/NACK for DL channel reception etc.

More specifically the reported feedback pattern sequence when expressed in terms of signal measurement(s) may be a specific combination of channel quality information (CQI) and/or precoder type information (PTI) for UTRA or any specific combination of channel quality information (CQI) and/or precoding matrix indicator (PMI) and/or rank indicator (RI) for E-UTRA. The reported feedback pattern sequence when expressed in terms of HARQ related information may be a specific sequence of ACK, NACK or their combination thereof.

The following characteristics should be considered for this sequence when using CSI in a pattern: it is a valid CQI/PTI or CQI/PMI/RI report, such that the rules already defined for the reporting of CSI feedback are not broken by the introduction of this new implicit signaling; the probability that the same sequence can be reported because of a particular fading conditions is low, in this way the probability of erroneous dual MIMO deactivation for this UE is reduced as much as possible.

The CQI represents the best modulation and coding scheme the UE can support according to the channel conditions seen by the UE over a certain period of time (which depends on the radio access technology). Since the channel conditions evolve in time the probability that the UE repeats the same CQI and PCI reports over several periods it low, the worst case being pedestrian type of channels which may have a long coherence time. In this case if the UE hits a deep fade for example the channel conditions can be low for a period of time at least close to the channel coherence time. Note that the coherence time is the time after which the correlation is 50%.

For example for 3 km/h the coherence time of the channel is ~18 ms.

The network node 600 expects to receive the pattern(s) upon a specific triggering condition e.g. after cell change of the UE 500 to a frequency band belonging to a certain subset S defined by the UE 500 (e.g. S∈{bands supported by the UE∩<threshold e.g. 1 GHz}, or S∈{bands supported by the UE ∩ roaming bands}, where ∩ means intersections of the ensembles or any other conditions where the UE 500 cannot support diversity for cost, size or power consumption reasons). According to another example of triggering condition the UE 500 may also report the pattern associated with a frequency band when UE 500 is configured to performed signal measurement (e.g. cell identification, CPICH RSCP etc) on cells operating on a carrier frequency belonging to that band. According to yet another example of triggering condition the UE 500 may report the pattern associated with a frequency band in case it identifies or measures a cell on that band whose signal measurement is above a threshold (e.g. CPICH RSCP is above −100 dBm); a strong cell may become candidate for the cell change.

One or more triggering conditions for reporting pattern(s) may also be pre-determined, which in turn ensures better coordination between UE 500 and network. In another example a mapping between triggering conditions and patterns may also be pre-determined. The network node 600 upon receiving the pattern(s) interprets them and their applicability and takes an appropriate action. If the pattern is sent to the serving node by the UE then the serving node may forward the pattern to the target network node by the forwarder 611. The target network node uses the pattern for one or more radio network operation depending upon whether the pattern indicates that UE 500 supports or does not support MIMO. Examples of such operations performed by the network node are: disabling MIMO or multi-antenna mode if UE 500 indicates that it does not support MIMO; configuring UE 500 to single antenna mode operation; assigning resources to the UE 500 corresponding to single antenna operation; explicitly disabling MIMO or multi-antenna mode via signaling; disabling MIMO or multi-antenna mode and configuration another enhanced feature supported by the UE 500 to compensate for throughput reduction due to disabling MIMO; avoiding cell change to a cell belonging to a band frequency band on which MIMO is not supported by the UE 500; performing cell change to a cell belonging to a frequency band on which MIMO is supported by the UE 500. Examples of enhanced features are carrier aggregation, CoMP/multi-point operation, high order modulation such as 64 QAM or above etc; partly disabling MIMO or multi-antenna mode if UE 500 indicates that it does not support MIMO i.e. configuring UE 500 to lower number of multi-stream operation than its maximum capability e.g. configuring UE 500 to operate using dual stream if it can support up to four stream multi-antenna mode operation, assigning resources corresponding to reduced number of streams for multi-antenna mode operation; enabling or continuing MIMO or multi-antenna mode if UE 500 supports MIMO.

These aspects are elaborated with the help of several examples detailed below.

In a first example, the UE signals valid CQI for a preferred single stream for at a number of CQI reporting spanning at least Tc where Tc is the channel coherence time. The example in particular applies to UTRA but can also be applicable to other technologies. The example is also applicable to multi-stream operation and not limited to dual stream.

If the UE has signaled the support of MIMO (or any multi-antenna operation mode) or if it supports MIMO based on pre-defined rule or if it is mandatory to support MIMO andif the UE is performing or has just performed the inter-frequency cell change (e.g. handover) from frequency A to frequency B and frequency B is belonging to a certain subset S defined by the UE (e.g. S∈{bands supported by the UE∩<threshold e.g. 1 GHz}, or S∈{bands supported by the UE ∩ roaming bands}, where ∩ means intersections of the ensembles), the UE can use a specific pattern to inform the network about the support of MIMO. The pattern indicates support of MIMO in UL or DL or both. The UE may also send separate patterns for MIMO support in UL and DL. Further, after the reception of the first CQI the network starts a timer and check the CQI reporting at time 'n' (CQI(n)) according to the following algorithm:

```
While (CQI(n)<=P and Timer < = Tc); this is CONDITION 1
    Timer = Timer + Time spanned by one CQI reporting i.e.
    incrementing timer value.
    n = n+1 i.e. increment n by 1
If Timer is <= Tc (The loop is stopped because a CQI >P is
found meaning that dual stream is preferred by the UE).
    The UE supports MIMO in this band, the network can schedule
    MIMO with dual stream or MIMO with single stream depending
    on network conditions
If Timer is > Tc
    The network DISABLES DUAL STREAM MIMO for this UE
```

In additional to this first example, if the UE has signaled the support of MIMO (or any multi-antenna operation mode) or if it supports MIMO based on pre-defined rule or if it is mandatory to support MIMO and P=21 for a UTRA UE or a suitable value of P for another RAT.

In a second example, the UE can signal any CQI combination such that CQI2 is fixed for at least Tc where Tc is the channel coherence time. The example in particular applies to UTRA but can also be applicable to other technologies. The example is also applicable to multi-stream operation and not limited to dual stream.

If the UE has signaled the support of MIMO or any multi-antenna operation mode) or if it supports MIMO based on pre-defined rule or if it is mandatory to support MIMO and if the UE is performing or has just performed the inter-frequency cell change (e.g. handover) frequency A to frequency B and frequency B is belonging to a certain subset S defined by the UE (e.g. S∈{bands supported by the UE∩<threshold e.g. 1 GHz}, or S∈{bands supported by the UE ∩ roaming bands}, where ∩ means intersections of the ensembles), the UE can use a specific pattern to inform the network about the support of MIMO. The pattern indicates support of MIMO in UL or DL or both. The UE may also send separate patterns for MIMO support in UL and DL. Further, after the reception of the first CQI report the network starts a timer and check the CQI reporting at time 'n' (CQI2(n)) according to the following algorithm:

```
While (CQI2(n)=M and Timer < = Tc); this is CONDITION 2
    Timer = Timer + Time spanned by one CQI reporting i.e.
    incrementing timer value.
    n = n+1 i.e. increment n by 1
If Timer is <= Tc (The loop is stopped because a CQI2 is different from
M is found meaning that a fixed CQI2 value was due to fading profile).
    The UE supports MIMO in this band, the network can schedule
MIMO
    with dual stream or MIMO with single stream depending on network
    conditions
```

```
If Timer is > Tc (it means that for at least Tc time the same CQI2
condition is reported, this is due to fading profile with low probability)
    The network DISABLES DUAL STREAM MIMO for this UE
```

According to a third example, the MIMO UE is configured to operate in a carrier aggregation configuration where at least one of the bands is at low frequency. The UE signals valid CQI for a preferred single stream for a number of CQI reporting spanning at least Tc where Tc is the channel coherence time for the low frequency band(s). The example in particular applies to UTRA but can also be applicable to other technologies. The example is also applicable to multi-stream operation and not limited to dual stream.

If the UE has signaled the support of MIMO (or any multi-antenna operation mode) or if it supports MIMO based on pre-defined rule or if it is mandatory to support MIMO and if the UE is configured or reconfigured to operate in a carrier aggregation configuration where at least one of the carrier operates at a frequency belonging to a certain subset S defined by the UE (e.g. S∈{bands supported by the UE∩<threshold e.g. 1 GHz}, or S∈{bands supported by the UE ∩ roaming bands}, where ∩ means intersections of the ensembles), the UE can use a specific pattern to inform the network about the support of MIMO. Further, after the reception of the first CQI the network starts a timer and check the CQI reporting at time 'n' (CQI(n)) according to the following algorithm:

```
While (CQI(n)<=P and Timer < = Tc); this is CONDITION 1
    Timer = Timer + Time spanned by one CQI reporting i.e.
    incrementing Timer value
    n = n+1 i.e. increment n by 1
If Timer is <= Tc (The loop is stopped because a CQI >P is
found meaning that dual stream is preferred by the UE).
    The UE supports MIMO in this band, the network can schedule
MIMO
    with dual stream or MIMO with single stream depending on network
    conditions
If Timer is > Tc
    The network DISABLES DUAL STREAM MIMO for this UE for
    this particular band.
```

In a further example, if the UE has signaled the support of MIMO (or any multi-antenna operation mode) or if it supports MIMO based on pre-defined rule or if it is mandatory to support MIMO and P=21 for a UTRA UE or a suitable value of P for another RAT.

According to a fourth example, the MIMO UE is configured to operate in a carrier aggregation configuration where at least one of the bands is at low frequency. The UE can signal any CQI combination such that CQI2 is fixed for at least Tc where Tc is the channel coherence time. The example also in particular applies to UTRA but can also be applicable to other technologies.

If the UE has signaled the support of MIMO (or any multi-antenna operation mode) or if it supports MIMO based on pre-defined rule or if it is mandatory to support MIMO andif the UE is configured or reconfigured to operate in a carrier aggregation configuration where at least one of the carrier operates at frequency belonging to a certain subset S defined by the UE (e.g. S∈{bands supported by the UE∩<threshold e.g. 1 GHz}, or S∈{bands supported by the UE ∩ roaming bands}, where ∩ means intersections of the ensembles), the UE can use a specific patter to inform the network about the support of MIMO. Further, after the reception of the first CQI report the network starts a timer and check the CQI reporting at time 'n' (CQI2(n)) according to the following algorithm:

```
While (CQI2(n)=M and Timer < = Tc); this is CONDITION 2
   Timer = Timer + Time spanned by one CQI reporting i.e. increment-
ing
     timer value
     n = n+1 i.e. increment n by 1
   If Timer is <= Tc (The loop is stopped because a CQI2 is different from
M is found meaning that a fixed CQI2 value was due to fading profile).
     The UE supports MIMO in this band, the network can schedule
MIMO
     with dual stream or MIMO with single stream depending on network
        conditions
   If Timer is > Tc (it means that for at least Tc time the same CQI2
condition is reported, this is due to fading profile with low probability)
     The network DISABLES DUAL STREAM MIMO for this UE
```

According to a further example, the first and third examples above may be applied to a E-UTRA UE in particular.

CONDITION 1 would be replaced by the following condition

While (Rank Indicator=1 and Timer<=Tc)

According to yet a further example, the network adjusts the parameter Tc after having estimated it. The network can estimate this by considering channel reciprocity. This means the network can determine the Tc on uplink signals and interpolate it to the Tc for the downlink. In one example the network may consider uplink and downlink Tc to be the same.

According to a further example, the timer threshold Tc is fixed and dictated by the lowest Doppler spread of the channel (pedestrian case).

According to a further example, the UE signals the Information Element (IE) "Support of MIMO only with single stream restriction" among its capabilities together with the support of full dual layer MIMO.

Note that this capability is currently ONLY valid for a UE which is capable of decoding MIMO control channels but it is not able to receive dual stream data (low complexity UE). Hence this Information Element (as indicated above) is ONLY valid when signaled in conjunction with a NON MIMO category. Under this example this signaling message or an information element (IE) is used in conjunction with the report of a dual stream MIMO category to warn the network about the possible UE lack in supporting MIMO in all the conditions.

With this example, the network can have the following behaviors: the network interprets this message as a warning, i.e. for frequencies belonging to a certain subset defined by the UE (e.g. S∈{bands supported by the UE∩<threshold e.g. 1 GHz}, or S∈{bands supported by the UE ∩ roaming bands}, where ∩ means intersections of the ensembles) the UE does not support full dual stream MIMO.

The network does not send dual streams to the UE after an inter-frequency handover in a frequency band belonging to the above mentioned set S for a number of TTI spanning the above mentioned parameter Tc, even though the UE reports the preference for dual streams according to the second and fourth embodiments above.

Under this example, the network can consider more aggressive algorithms in order to disable MIMO for the UE by exploiting the information sent via the above mentioned IE (e.g. shortening Tc period for example).

According to a further example the network node receiving the pattern indicating the support of UL and/or DL MIMO (or combination of MIMO with other features such as CA, CoMP etc) from the UE can maintain a data base to store the statistics of the patterns. Examples of network node are base station, relay node, access point, donor node controlling relay, Node B, eNode B, RNC, MSR node etc. The statistics are collected from multiple UEs and also several reports from the same UE over time. The network node also associates the received patterns with the carrier frequencies/frequency bands on which the UE sends pattern or to which the pattern is applicable. In addition the network node may also associate the pattern and the frequency/bands with the radio conditions in which the UE supports or does not support multi-antenna operation. Based on this statistics the network node can implicitly determine the UE capability in terms of supporting multi-antenna operation for different bands and also optionally under different radio conditions. The determined UE capability is then maintained in the network node as part of the data base.

According to a further example, the network node determining the UE capability based on statistics of received patterns from the UE, may use the determined information for one or more radio network operation or radio resource management tasks: determining whether to select single stream for dual stream operation for a particular UE under specific conditions e.g. under low frequency band operation or under any other subset of bands, under specific radio conditions leading to high correlation between antennas etc; assigning resources to the UE and/or configuring UE with the most appropriate antenna operating scheme; forwarding the following information to the other network nodes: determined UE capability as described above, and information related to supported or unsupported bands for multi-antenna operation and optionally information related to radio conditions for which multi-antenna operation is supported or not supported on certain bands.

According to a further example, the network node determining the UE capability based on any of the method described above may perform a cell change of the UE to ensure that the UE can continue its operation using MIMO. For example consider a UE supports three bands I, III and VIII. The UE is currently operates on band I with MIMO. The network determined that the UE supports MIMO on band III but not on band VIII e.g. determination can be based on statistics or received pattern(s) when measuring cells on bands III and VIII. Consider the signal quality of the serving cell on band I is below a threshold and therefore cell needs to be changed. The network (e.g. serving RNC or BS) may perform cell change (e.g. handover) of the UE to a target cell on band III instead to a target cell on band VIII even if the cell on band VIII is the best cell.

Examples of other network nodes are neighboring base station, Node B, MSR node, eNode B, RNC, BSC, O&M, OSS, SON etc. The information (e.g. pattern) can be signaled over a relevant interface by the network node to the other network node depending upon the two nodes. Examples of interfaces are Iub between Node B and RNC, Iub between RNCs, X2 between eNBs, in between a relay and its donor enodeB in LTE etc. The other network node uses the above information for network management tasks. Examples of such tasks are radio operation tasks described above, planning and configuration of network parameters such as deploy or enhancing coverage of bands or frequencies for which large number of UEs support multi-antenna operation etc.

The examples related to the signaling a pattern of sequence by the UE to the network node to indicate support of multi-antenna operation may also be applied to other scenarios. For example the UE may indicate its capability also when operating at higher frequency band but when operating under certain condition or scenario. Under such scenario due to limited resources in the UE and/or additional processing required by the UE the UE may indicate via a pattern of sequence (e.g. CSI based pattern) that it does not support multi-antenna operation or support it with reduced capability (e.g. dual stream instead of 4 steams). The multi-antenna operation may comprise of multi-antenna reception and/or transmission. Examples of such scenario are: device to device communication (i.e. when communicating with another device). In this case the UE has to maintain communication link with the network node. The UE may send a pattern to the network node and/or to another device indicating whether it supports multi-antenna operation only on D2D link, only on communication link between UE and network node. Depending upon UE battery power: when UE battery power is below threshold (i.e. low) the UE indicates that it does not support the multi-antenna operation due to low battery power. UE power consumption increases when UE uses multi-antenna operation; when UE battery power becomes above a threshold the UE indicates that it can now support the multi-antenna operation.

As a result, the overhead due to MIMO for the network in cases when the benefits of MIMO cannot be reached because of physical limitations is reduced. Further, the power consumption and battery consumption due to having the secondary antenna(s) always on even in cases when MIMO cannot bring benefits is reduced. Also uplink signaling overhead is reduced because the information is brought via implicit signaling by reusing CSI feedbacks. Another benefit is that it will enable a UE with a broken diversity antenna to still function in the network as it has a mean to inform the network that the second antenna does not work.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or an does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of operating user equipment in a communication network to inform the communication network of the availability of MIMO mode of communication, the method comprising:

determining the availability of MIMO mode of communication of the user equipment, independently, for each available frequency band; and transmitting an indicator indicating the determined availability of MIMO mode of communication of the user equipment, independently, for each available frequency band, via a feedback channel between the user equipment and a node of the communication network;

wherein transmitting the indicator of the determined availability of MIMO mode of communication of the user equipment comprises transmitting a specific sequence of feedback information on the feedback channel.

2. The method of claim 1, wherein the availability of MIMO mode of communication of the user equipment comprises at least one of the following:

current availability of MIMO mode of communication for a particular frequency band; and a capability of MIMO mode of communication for the particular frequency band.

3. The method of claim 1, wherein the specific sequence of feedback information is transmitted using an existing feedback channel.

4. The method of claim 1, wherein the specific sequence of feedback information is predetermined or is configurable.

5. The method of claim 1, wherein the specific sequence of feedback information includes additional information for facilitating determination and interpretation of the specific sequence of feedback information, and wherein the additional information includes at least one of:

a length of the sequence;

a time interval between sequences; sequence start and end times;

a feature of the MIMO mode of communication for which the sequence is applicable;

a direction of applicability;

a type of feedback information of the sequence;

sequence repetition characteristics;

a sequence triggering condition; and a sequence terminating condition.

6. The method of claim 1, wherein the feedback information comprises at least one of:

signal measurement values of the communication channel between the user equipment and the node of the communication network;

channel state information; and

HARQ feedback.

7. The method of claim 1, wherein transmitting the indicator of the determined availability of MIMO mode of communication of the user equipment, independently, for each available frequency band comprises transmitting the indicator periodically, aperiodically, or in response to a trigger.

8. A method of operating a node of a communication network to control mode of communication between the communication network and at least one user equipment, the method comprising:

receiving, at the node of the communication network, an indicator of the availability of MIMO mode of communication of the at least one user equipment, independently, for each available frequency band via a feedback channel between the at least one user equipment and the node of the communication network, wherein the indicator comprises a specific sequence of feedback information; and controlling the MIMO mode of communication between the node of the communication network and the at least one user equipment, independently, for each available frequency band, in response to the received respective indicator.

9. The method of claim 8, wherein the availability of MIMO mode of communication of the at least one user equipment comprises at least one of:

a current availability of MIMO mode of communication for a particular frequency band; and a capability of MIMO mode of communication for the particular frequency band.

10. The method of claim 8, wherein the specific sequence of feedback information is received using an existing feedback channel.

11. The method of claim 8, wherein the specific sequence of feedback information includes additional information for facilitating determination and interpretation of the specific sequence of feedback information, and wherein the additional information includes at least one of:
a length of the sequence;
a time interval between sequences;
sequence start and end times;
a feature of the MIMO mode of communication for which the sequence is applicable;
a direction of applicability;
a type of feedback information of the sequence;
sequence repetition characteristics;
a sequence triggering condition; and
a sequence terminating condition.

12. The method of claim 11, wherein the method further comprises:
determining the specific sequence of feedback information on the feedback channel, and
interpreting the specific sequence of feedback information to determine the availability of MIMO mode of communication of the at least one user equipment, independently, for each available frequency band, and
wherein controlling the mode of communication comprises controlling the mode of communication between the node of the communication network and the at least one user equipment, independently, for each available frequency band in response to the respective interpreted specific sequence of feedback information,
wherein determining the specific sequence of feedback information and interpreting the specific sequence of feedback information comprises receiving additional information included with the received indicator and determining the specific sequence of feedback information and interpreting the specific sequence of feedback information based on the received additional information.

13. The method of claim 8, wherein the feedback information comprises at least one of:
signal measurement values of the communication channel between the user equipment and the node of the communication network;
channel state information; and
HARQ feedback.

14. The method of claim 8, wherein the received indicator is transmitted by the node to at least one other node of the communication network.

15. The method of claim 8, wherein the method further comprises:
determining the specific sequence of feedback information for indicating the availability of MIMO mode of communication of the user equipment by the user equipment on the feedback channel; and
configuring the user equipment with the determined specific sequence of feedback information.

16. A user equipment comprising:
a multi-antenna;
a transceiver configured to enable MIMO mode of communication between the user equipment and a node of a communication network via the multi-antenna; and a processor configured to determine the availability of MIMO mode of communication of the user equipment and to provide an indicator of the determined availability of MIMO mode of communication of the user equipment, independently, for each available frequency band;
wherein the transceiver is further configured to transmit the indicator, independently, for each available frequency band via a feedback channel between the user equipment and the node of the communication network, wherein the indicator comprises a specific sequence of feedback information.

17. The user equipment of claim 16, wherein the specific sequence of feedback information is predetermined or is configurable.

18. The user equipment of claim 16, wherein the specific sequence of feedback information includes additional information for facilitating determination and interpretation of the specific sequence, and wherein the additional information includes at least one of:
a length of the sequence;
a time interval between sequences;
sequence start and end times;
a feature of the MIMO mode of communication for which the sequence is applicable;
a direction of applicability;
a type of feedback information of the sequence;
sequence repetition characteristics;
a sequence triggering condition; and
a sequence terminating condition.

19. The user equipment of claim 16, wherein the feedback information comprises signal measurement values of the communication channel between the user equipment and the node of the communication network, or channel state information, or HARQ feedback.

20. The user equipment of claim 16, wherein the transceiver is further configured to transmit the indicator, independently, for each available frequency band periodically, aperiodically, or in response to a trigger.

21. The user equipment of claim 16 wherein the transceiver is further configured to receive control information from the node of the communication network, independently, for each available frequency band via the multi-antenna and wherein the user equipment further comprises a controller for controlling the mode of operation of the transceiver, independently, for each available frequency band, in response to the received control information.

22. A node of a communication network comprising:
a receiver configured to receive an indicator of the availability of MIMO mode of communication of at least one user equipment, independently, for each available frequency band via a feedback channel between the at least one user equipment and the node of the communication network, wherein the indicator comprises of specific sequence of feedback information;
an interpreter configured to interpret the received indicator to determine the availability of MIMO mode of communication of the at least one user equipment, independently, for each available frequency band; and
a controller configured to control the mode of communication between the node of the communication network and the at least one user equipment, independently, for each available frequency band, in response to the respective interpreted specific sequence of feedback information.

23. The node of claim 22, further comprising a forwarder configured to transmit the received indicator to at least one other node of the communication network.

* * * * *